US008751552B2

(12) United States Patent
Caputo et al.

(10) Patent No.: US 8,751,552 B2
(45) Date of Patent: *Jun. 10, 2014

(54) SYSTEM AND METHOD OF GENERATING COMPLEX WAVEFORMS

(75) Inventors: Robinson Gaudino Caputo, Minas Gerais (BR); Luiz Gustavo Varella Figueiredo, Geneva, IL (US)

(73) Assignee: The Pulse Perfect Corporation, Inc., Geneva, IL (US)

( * ) Notice: Subject to any disclaimer, the term of this patent is extended or adjusted under 35 U.S.C. 154(b) by 793 days.

This patent is subject to a terminal disclaimer.

(21) Appl. No.: 12/885,792

(22) Filed: Sep. 20, 2010

(65) Prior Publication Data

US 2011/0153703 A1 Jun. 23, 2011

Related U.S. Application Data

(63) Continuation-in-part of application No. 10/463,482, filed on Jun. 17, 2003, now Pat. No. 7,801,936.

(51) Int. Cl.
*G06F 1/02* (2006.01)

(52) U.S. Cl.
USPC .......................................................... 708/270

(58) Field of Classification Search
None
See application file for complete search history.

(56) References Cited

U.S. PATENT DOCUMENTS

| | | | |
|---|---|---|---|
| 6,580,902 B1 * | 6/2003 | Sorrells et al. | 455/333 |
| 6,687,493 B1 * | 2/2004 | Sorrells et al. | 455/323 |
| 6,836,650 B2 * | 12/2004 | Sorrells et al. | 455/319 |
| 7,801,936 B2 * | 9/2010 | Caputo et al. | 708/270 |
| 2004/0257123 A1 * | 12/2004 | Caputo et al. | 327/100 |
| 2011/0153703 A1 * | 6/2011 | Caputo et al. | 708/270 |

* cited by examiner

*Primary Examiner* — David H Malzahn
(74) *Attorney, Agent, or Firm* — Marshall, Gerstein & Borun LLP

(57) ABSTRACT

Methods for generating complex waveforms, including step functions, impulse functions, and gate pulses are provided, as well as methods for generating modulated waveforms employing a number of known and newly developed modulation formats. The methods of the present invention employ a continuous linear function, wherein all output points are defined. Discontinuities and singularities are eliminated, yet pulses having nearly instantaneous transitions may be achieved. Thus, gate pulses step functions, binary waveforms and the like may all be generated from a single function, where they entire output range of the function is defined over a continuous input domain.

2 Claims, 15 Drawing Sheets

SYSTEM AND METHOD OF GENERATING COMPLEX WAVEFORMS

This application is a continuation-in-part of U.S. patent application "Method of Generating Complex Waveforms and Modulating Signals," Ser. No. 10/463,482 filed Jun. 17, 2003, now U.S. Pat. No. 7,801,936.

BACKGROUND OF THE INVENTION

The present invention relates to methods for generating complex waveforms and modulated signals. Using conventional mathematical techniques, it is difficult to express many output functions commonly used in telecommunications, computing, machine control and other electronic systems. For example, using conventional techniques it is impossible to express a single square pulse having a value of one over a short input range and value of zero elsewhere. At least two equations are required (y=1, y=0) along with restrictions as to the locations where one equation or the other holds sway.

Another problem in mathematically expressing square pulses, binary bit streams and other common waveforms is the mathematical difficulty in expressing discontinuities or singularities such as those that occur at the transitions between 0 and 1 and from 1 to 0 in binary signals. Theoretically these transitions take place instantaneously, the output function being undefined at the point of transition. Practically, this can lead to uncertainty when such functions are applied to electronic circuits and the like. Intermediate values can be recorded at the transitions, leading to ambiguous or inaccurate results.

Such singularities occur in many commonly used waveforms. Step functions, gate pulses, impulse functions, and the like, all raise difficult problems of mathematical expression for scientists and engineers who work with such waveforms everyday. In fact, solutions to these types of problems must be designed into the hardware circuitry of many digital electronics devices. Timing circuits, error correcting circuits and the like are necessary to verify data and synchronize signals to ensure that bits are not being read during binary transitions, for example. This adds to the cost, complexity and size of many devices.

Conventional mathematics for encoding data onto binary and other signals are also complex. Many modulation techniques such as pulse width modulation, time division multiplexing (TDM), code division multiple access, and the like, all require extensive mathematical algorithms to implement. Again, the complexity of the mathematics results in complex hardware and software solutions for generating and using such signals. Synchronization is also a problem with many current digital systems. Ensuring that bits are read at the proper times and other timing and phase shift issues can greatly add to the complexity of digital systems.

Finally, because the binary transitions in digital signals and singularities in other discontinuous functions are undefined, they represent a portion of a signal that may not be used for carrying information. The density of data carried by a binary signal can be greatly increased if it is possible to mathematically define the transitions between ones to zeroes and zeroes to ones in an easy convenient manner and in such a way that the transitions themselves are capable of carrying data.

In light of the above, there presently exists a need for improved methods of generating and expressing complex waveforms. Improved methods of generating waveforms should accommodate waveforms which have traditionally been difficult to express mathematically such as step functions, gate functions and the like. Furthermore, the output position of such functions should be controlled with great precision so that it may be accurately predicted when pulses should or should not occur.

New modulation techniques are also needed for implementing such improved methods of generating complex waveforms. Ideally, such techniques should allow every aspect of a complex waveform to be determined by either a single function or by cascading a series of like functions. Furthermore, such improved techniques should allow for multiple modulation schemes to be added to a single carrier so that the density of data stored on the carrier may be greatly increased.

SUMMARY OF THE INVENTION

The present invention relates to methods of generating complex waveforms and modulated output signals. A linear and continuous function is provided by which any number of output waveforms may be expressed using a single equation. Using the present technique even waveforms which have traditionally resisted convenient mathematical expression due to discontinuities and singularities may be expressed and manipulated in an elegant straight forward manner.

According to the present invention complex continuous waveforms may be generated using a single function wherein an output value of the waveform is unambiguously defined for every input value of a continuous input domain. According to the invention, the output waveform includes at least one operational window. The significance of the operational window is that the output waveform is substantially equal to zero or some other base value at input points outside the operational window. For input points within the operational window the output waveform is equal to the value of a specified window function. An important feature of the present invention is that the position of one or more such operational windows may be controlled with great precision. A position locus function establishes a base position for each operational window, and a phase shift parameter determines the actual position of the operational window relative to this base position or locus.

The method includes the step of providing a continuous linear function such as the DNAX function disclosed herein. The function provided includes a number of input parameters that can be manipulated in order to provide a desired output waveform. In an embodiment of the invention the parameters include a phase shift parameter d for adjusting the phase of the one or more operational windows relative to the zero crossings of a position locus function. A second parameter n(x) determines the slew rate, the speed of the transitions between output values of the generated waveform corresponding to input values outside the operational window and input values within the operational window. A third parameter a(x) determines the size of the operational window aperture, and a fourth parameter X(x) establishes the position locus of the operational window. A selectable window function $f(x)$ determines the shape of the output waveform within the operational window and a weighting factor b(x) may be provide which affects the linearity of the window function $f(x)$ within the operational window.

The second step in the process is selecting appropriate values for the above described parameters and functions to generate an output waveform of the desired shape using the single function. Such waveforms may be added subtracted, multiplied, divided or input to additional functions including additional DNAX functions, adding further complexity to the shape of the desired output waveform.

The present invention may also be employed to generate one or more pulses. Again, a continuous function is provided. The function includes a position locus parameter for determining the position of each of the one or more pulses, an aperture parameter for determining the width of each pulse, and a slew rate parameter for determining the rate at which the transitions at the edges of the one or more pulses occur. The amplitude of each of the one or more pulses can be determined by a window function or may be set equal to a constant. The position locus parameter may then be set equal to some function having at least one x-intercept, such that pulses occur at positions related to the one or more x-intercepts of the position locus function. By applying appropriate values to the input parameters gate pulses, step pulses, impulses and other pulse shapes may be generated. Furthermore, applying a function having multiple x-intercepts such as a periodic sinewave or some other non-periodic function having multiple x-intercepts as the position locus function causes a whole series of pulses to be formed. Each pulse is located based on the position of the zero crossings of the position locus function.

The present invention employing the DNAX function may also be employed to generate waveforms that have been modulated according to a number of different modulation techniques. For example, pulse width modulation, pulse position modulation, pulse amplitude modulation, as well as time division multiplexing, code division multiple access, and other known signaling techniques may be implemented with an ease which heretofore has not been achieved. Furthermore, new modulation techniques such as slew rate modulation and high volume high density modulation are also made possible by the inventive methods described and claimed in the present specification.

Additional features and advantages of the present invention are described in, and will be apparent from, the following Detailed Description of the Invention and the figures.

input to the position locus parameter X(x) of the DNAX function.

Figure 9:
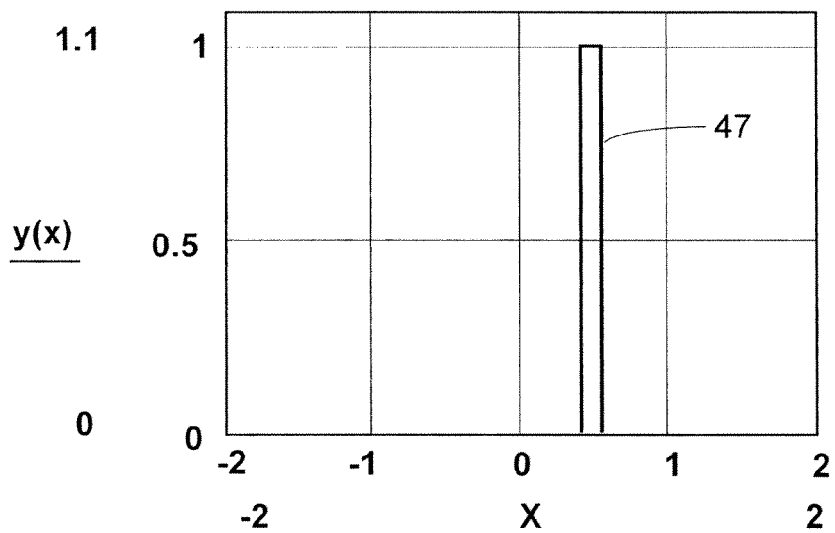

FIG. 9 is a plot showing a rectangular pulse ⅛ wide phase shifted 0.5.

Figure 10:
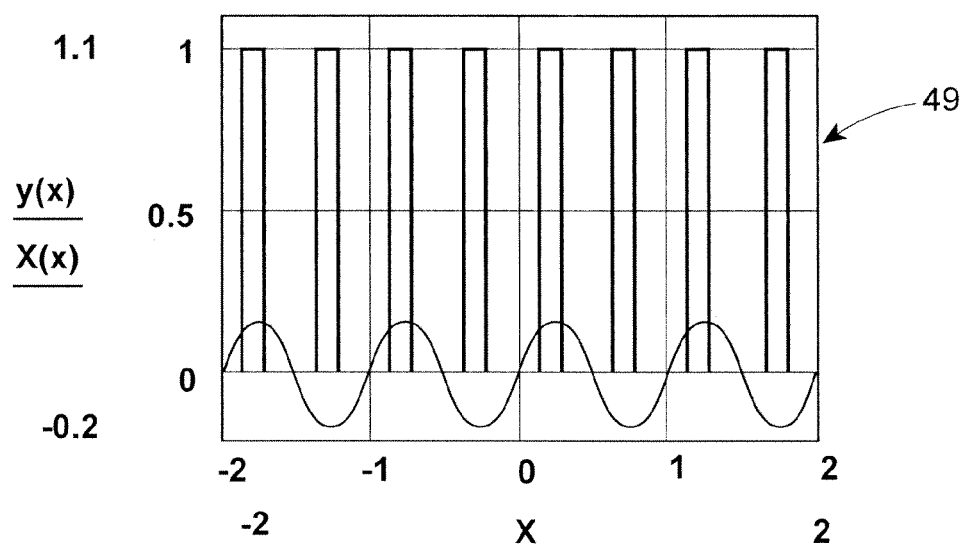

FIG. 10 is a plot showing a series of rectangular pulses ⅛ wide phase shifted 0.7.

Figure 11:
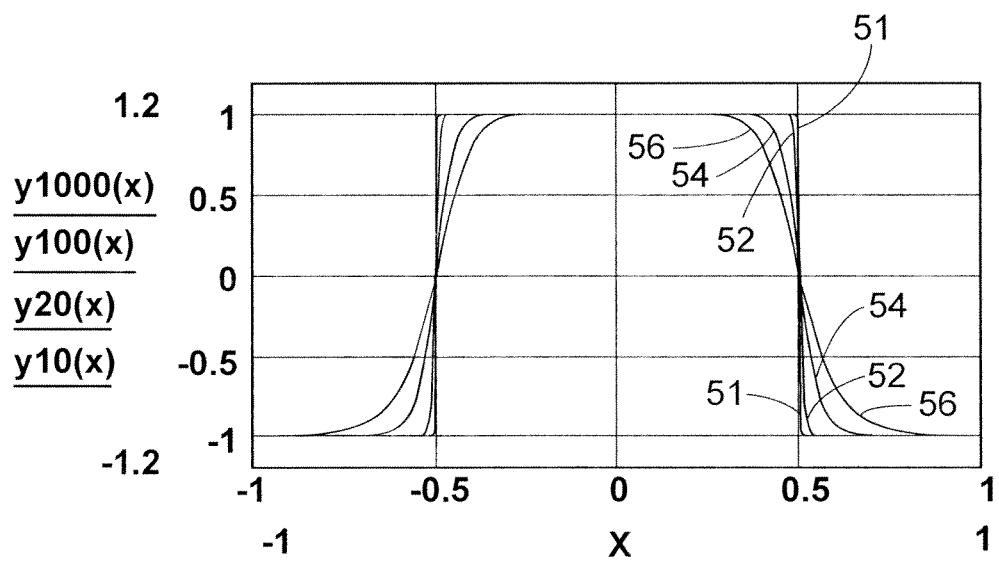

FIG. 11 is a plot showing several superimposed rectangular pulses generated using the DNAX function, each pulse was created with a different value of the slew rate parameter n(x).

Figure 12:
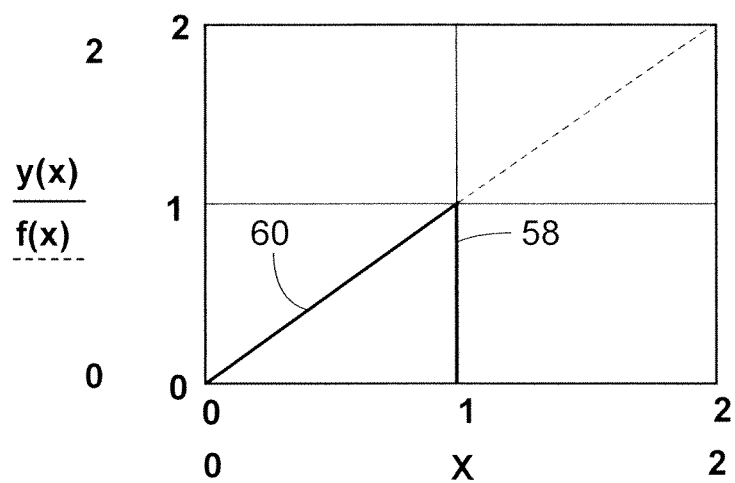

FIG. 12 is a plot of a waveform generated using the DNAX function with no weighting factor (b(x)=1).

Figure 13:
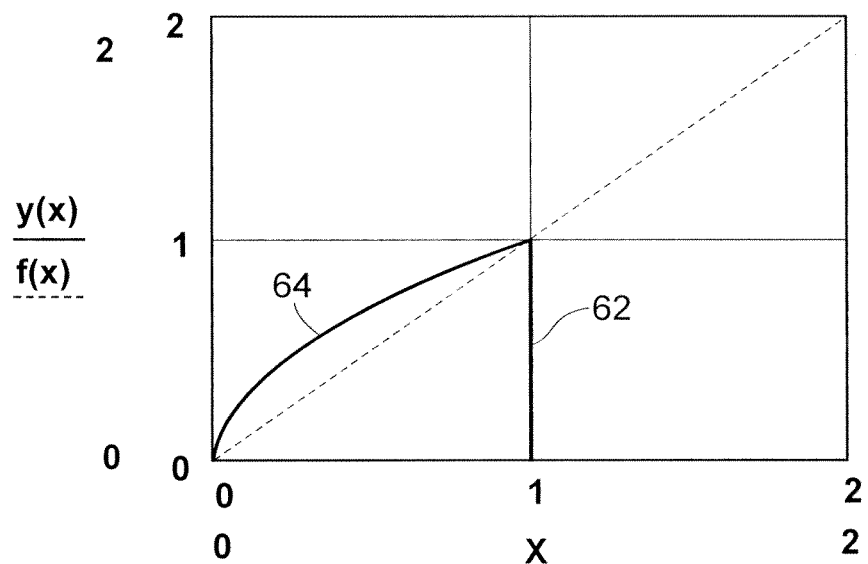

FIG. 13 is a plot showing a waveform generated using the DNAX function similar to the waveform shown in FIG. 10, but with a positive weighting factor greater than one, (b=0.5).

Figure 14:
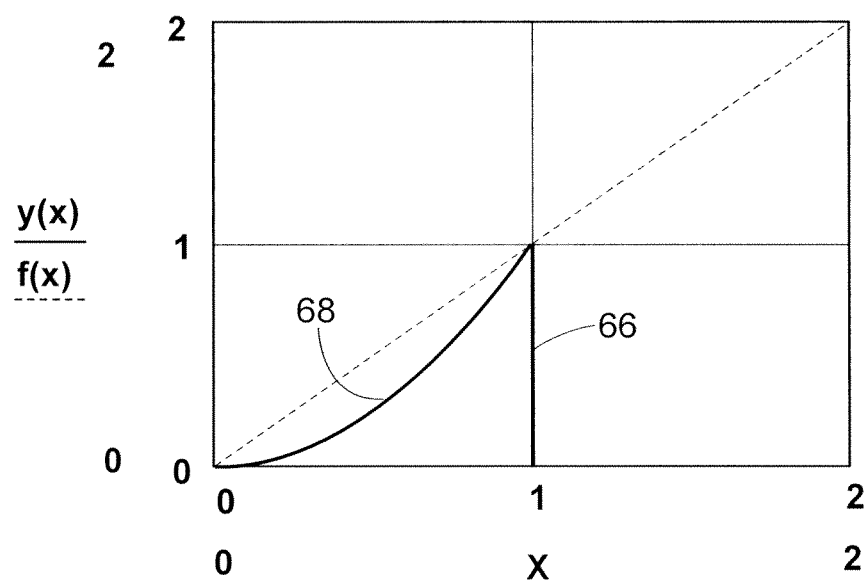

FIG. 14 is a plot showing a waveform generated using the DNAX function similar to the waveform shown in FIG. 10, but with a positive weighting factor less than one, (B=2).

Figure 15:
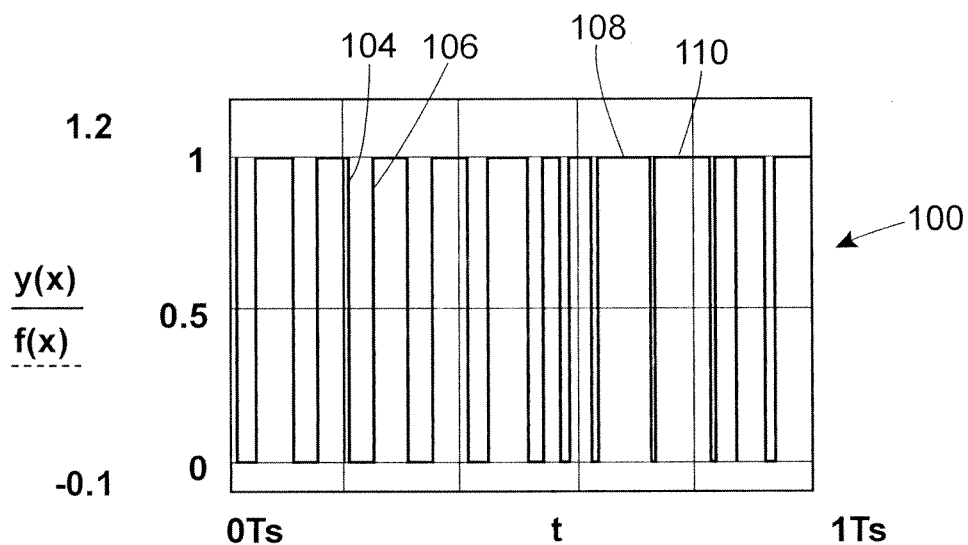

FIG. 15 is a plot showing a pulse width modulated output waveform generated using the DNAX function.

Figure 16:
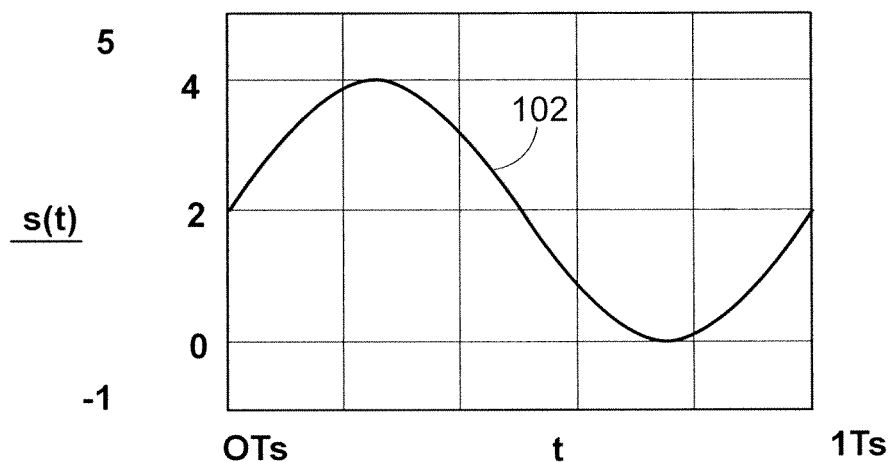

FIG. 16 is a plot showing the modulating signal for generating the PWM waveform of FIG. 15.

Figure 17:
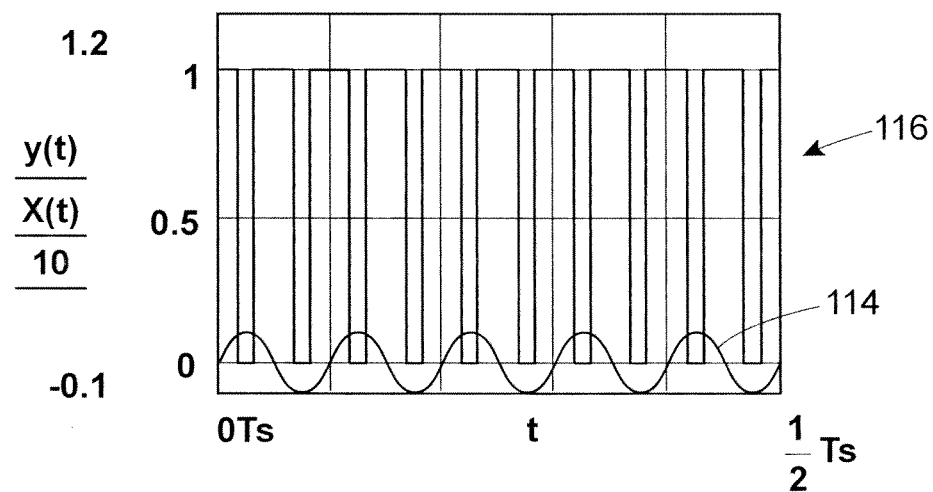

FIG. 17 is a plot of the unmodulated pulse train generated using the DNAX function prior to being modulated by the modulating signal shown in FIG. 14, along with the position locus function X(t)=Sin(2π·50×10³t).

Figure 18:
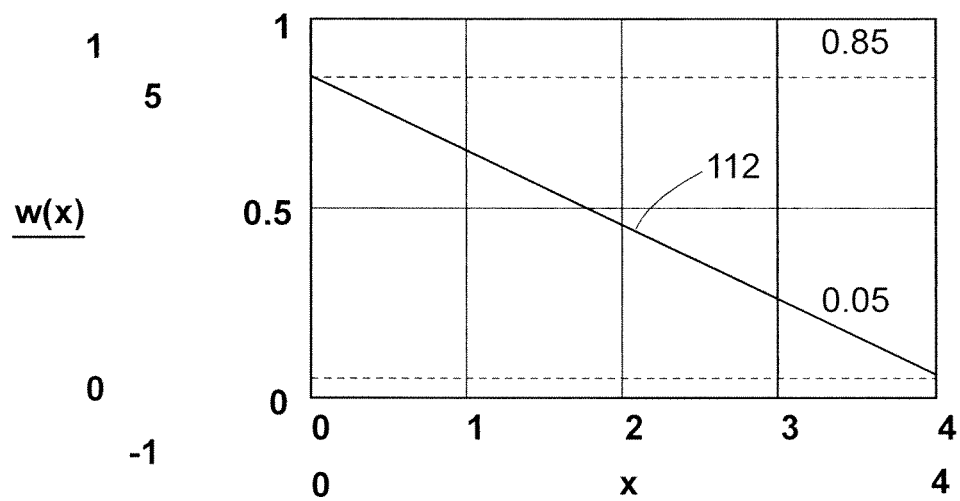

FIG. 18 is a graphical representation of the linear transfer function for determining the width of pulses in the PWM waveform of FIG. 15 in relation to the corresponding magnitude of the modulating signal s(t) shown in FIG. 16.

Figure 19:
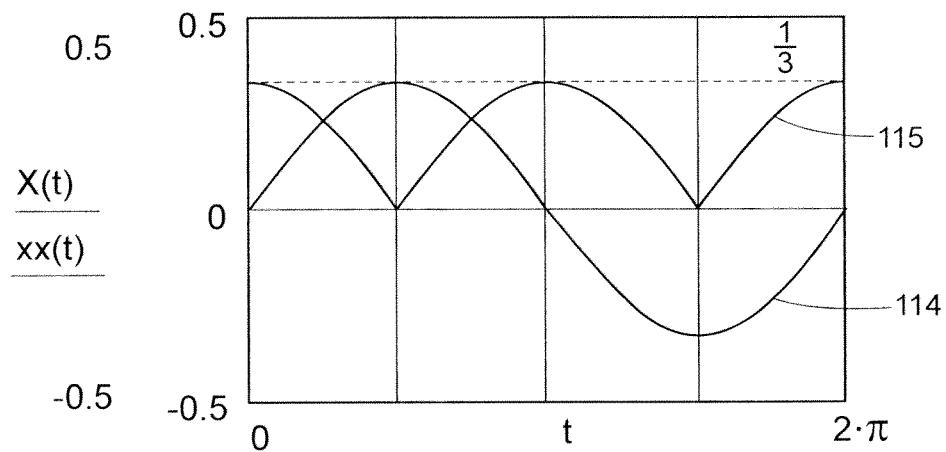

FIG. 19 is a plot showing the position locus function $$X(t) = \frac{1}{3}\sin\omega t$$

and the absolute value of its derivative $$\left| \frac{d}{dx} \frac{1}{3}\sin\omega t \right|.$$

Figure 20:
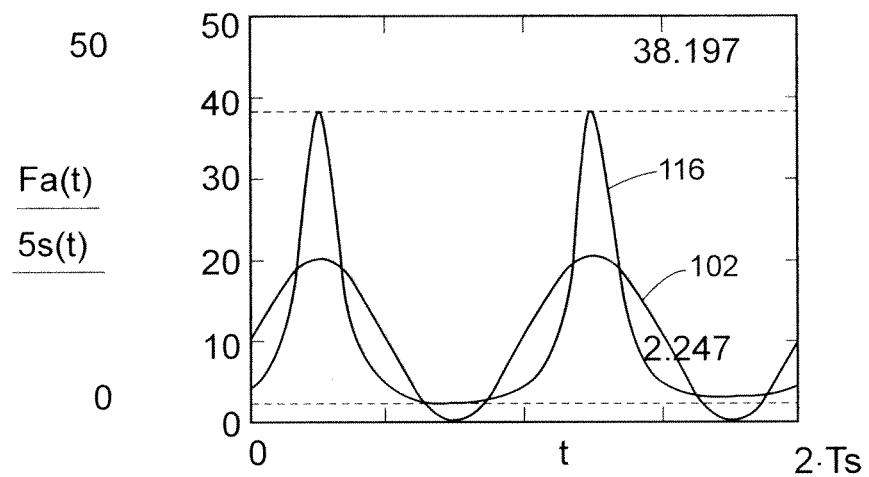

FIG. 20 is a plot showing the modulating index function which is input to the operational window aperture function of the DNAX function to modulate the width of the output pulses according to the modulating signal s(t) which is also shown for reference.

Figure 21:
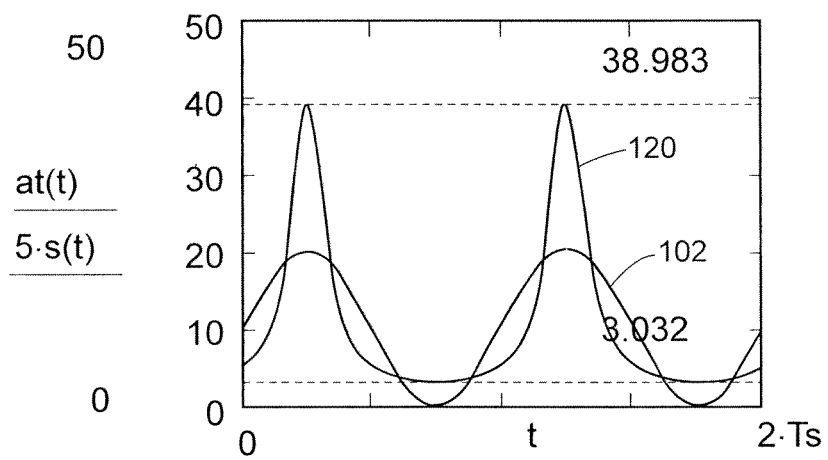

FIG. 21 is the modulation index function of FIG. 20 with a constant $$c = \frac{\pi}{4}$$

added thereto.

Figure 22:
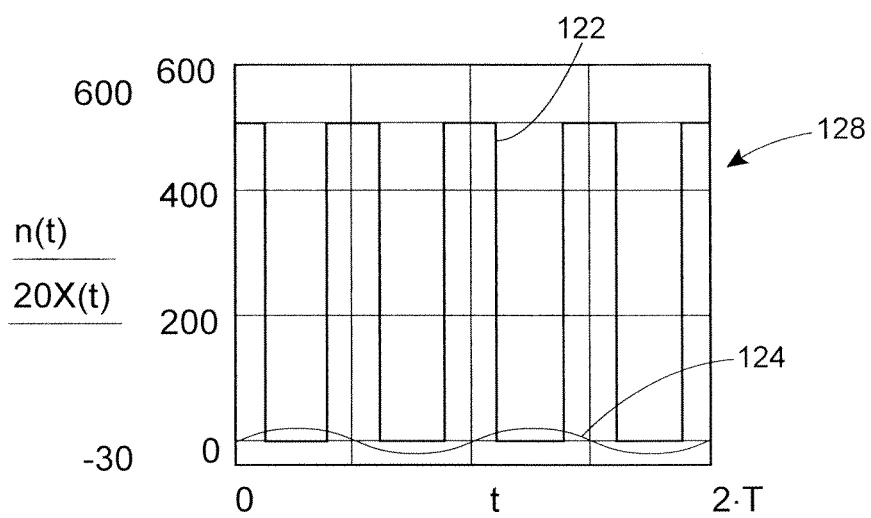

FIG. 22 is a plot showing a rectangular modulating signal generated using the DNAX function to be input as the slew rate parameter n(t) in a second DNAX function to implement slew rate modulation (SRM) along with the position locus function X(t) for generating the rectangular pulses.

Figure 23:
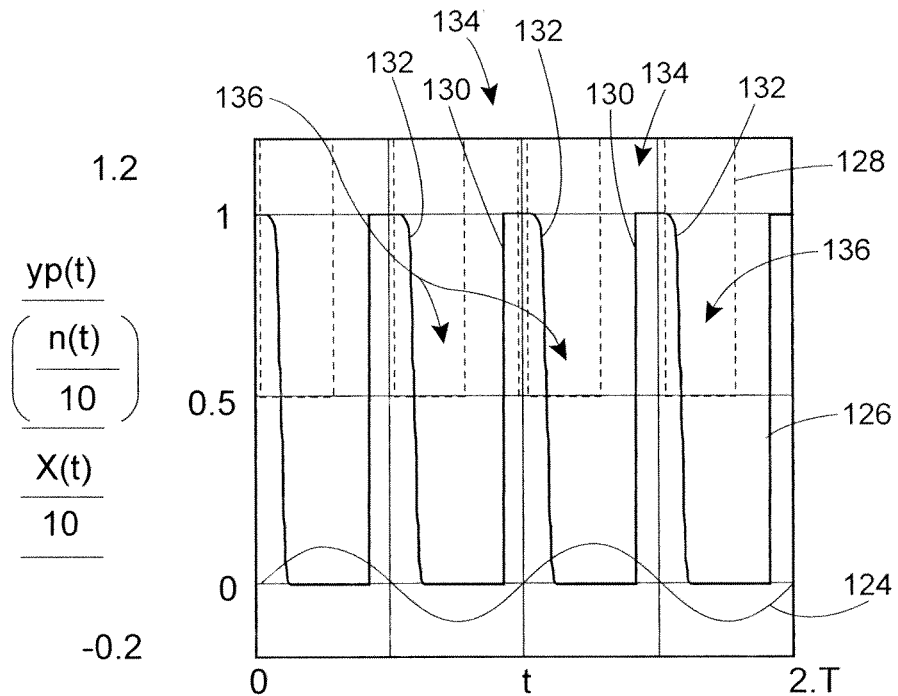

FIG. 23 is a plot of a slew rate modulated waveform generated using the DNAX function, with the waveform shown in FIG. 22 input as the slew rate parameter n(t).

Figure 24:
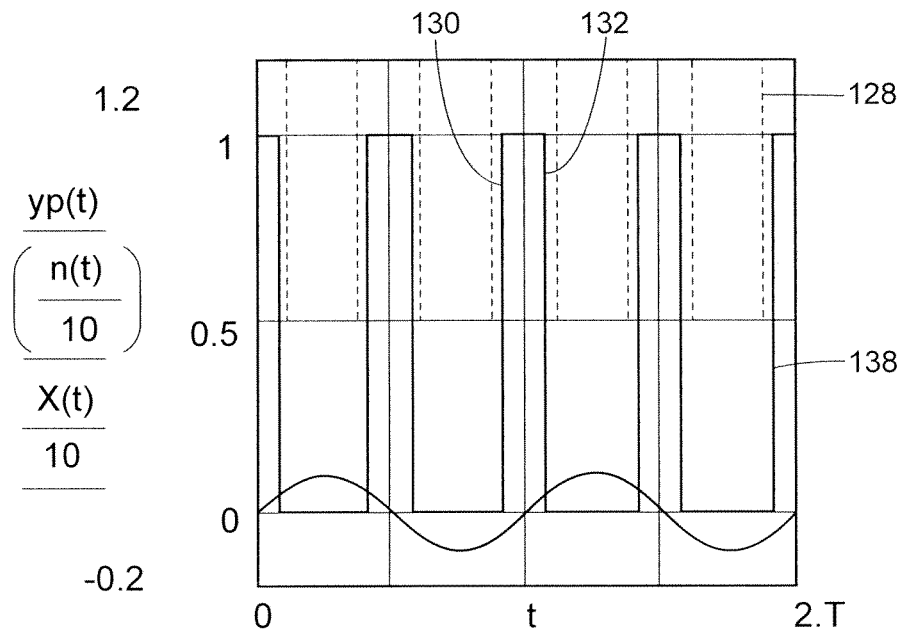

FIG. 24 is a plot of a slew rate modulated waveform generated using the DNAX function in substantially the same manner as the waveform shown in FIG. 23, but wherein the phase of the rectangular input to the parameter n(t) has been adjusted such that both the leading and trailing transitions of each pulse fall within areas corresponding to relatively high slew rate.

Figure 25:
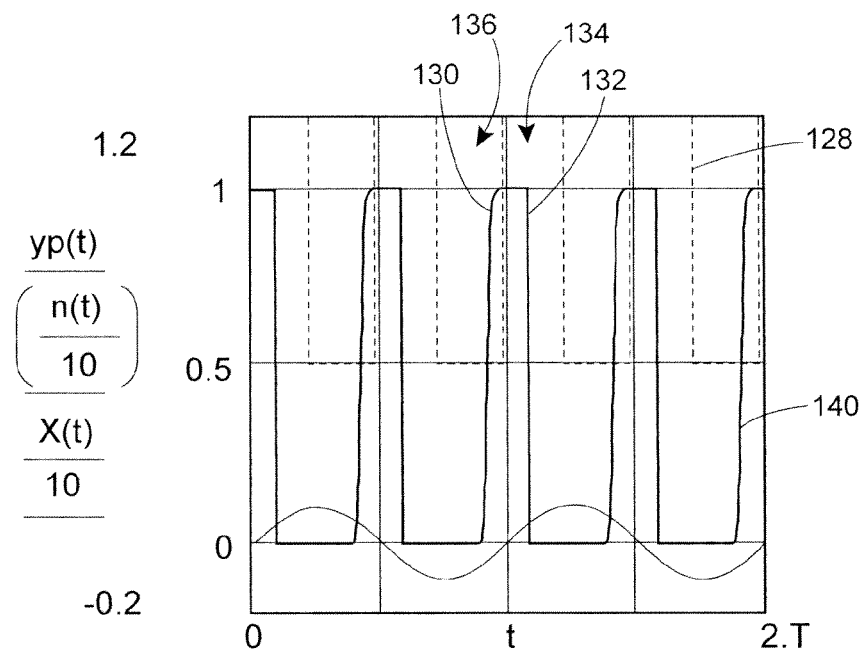

FIG. 25 is a plot of a slew rate modulated waveform generated using the DNAX function in substantially the same manner as the waveforms shown in FIGS. 23 and 24, but wherein the phase of the rectangular input to the slew rate parameter has been adjusted such that the leading edge of each pulse is located in an area corresponding to an area of relatively low slew rate and the trailing edges are located in areas corresponding to relatively high slew rate.

Figure 26:
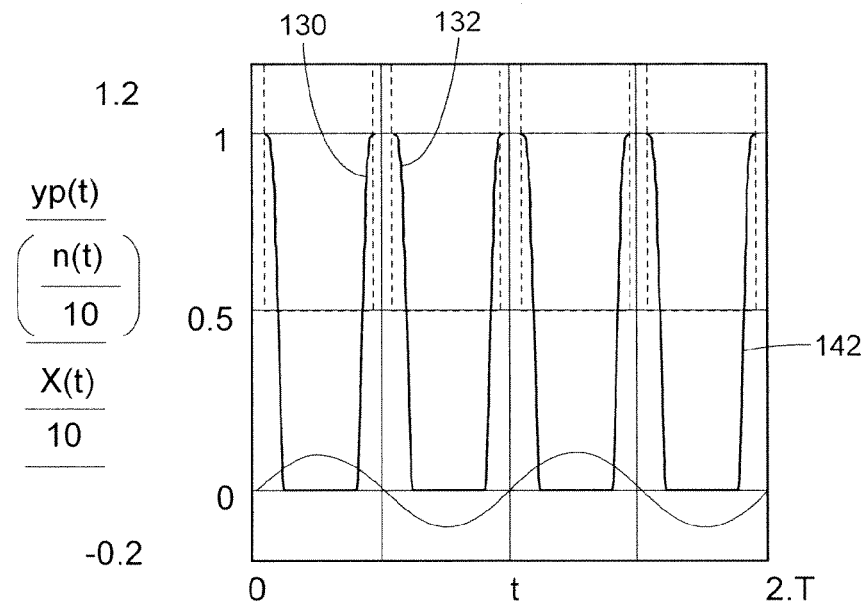

FIG. 26 is a plot of a slew rate modulated waveform using the DNAX function in substantially the same manner as the waveforms shown in FIGS. 23, 24 and 25, but wherein the operational window aperture parameter a(t) of the first DNAX function has been adjusted to reduce the duty cycle of the modulating signal pulses n(t), such that both the leading and trailing edges of each pulse of the output waveform y(t) falls in an area corresponding to relatively low slew rate.

Figure 27:
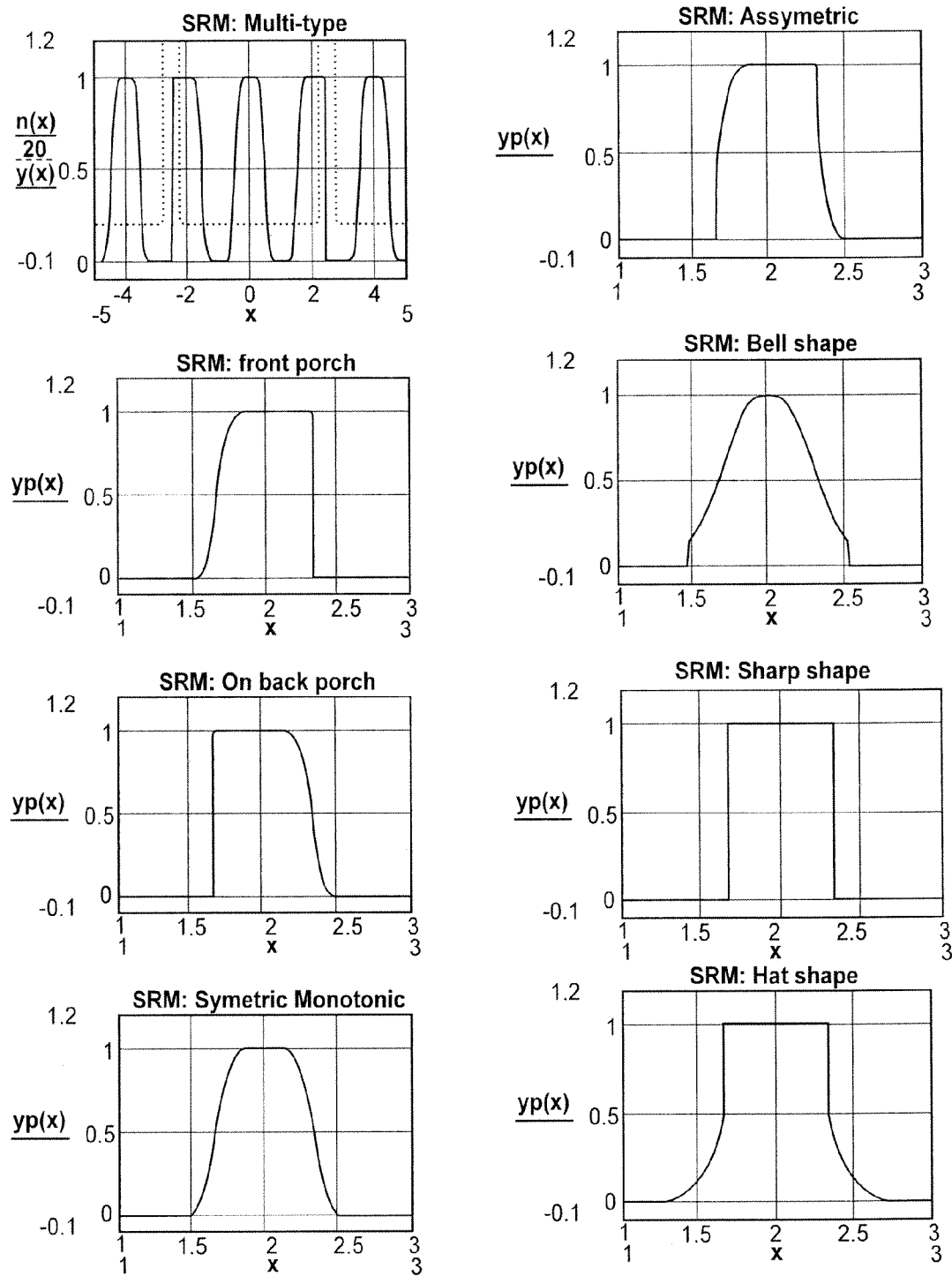

FIG. 27 shows a plurality of different pulse shapes that may be achieved using slew rate modulation according to the present invention.

Figure 28:
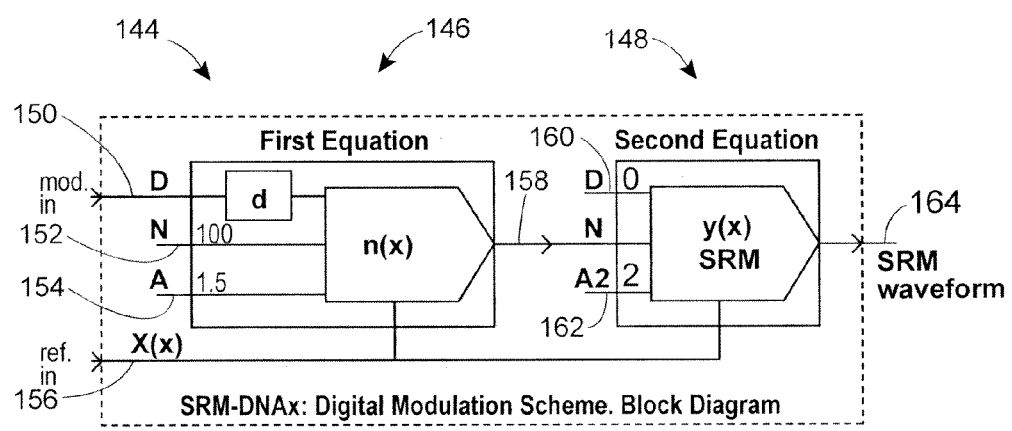

FIG. 28 shows a functional block diagram for performing slew rate modulation using the DNAX function according to the present invention.

DETAILED DESCRIPTION OF THE INVENTION

The present invention relates to methods of generating complex waveforms and signal modulation techniques for use in communications, signal processing, manufacturing, and other applications. The methods of the present invention are based on the application of a unique function which has been given the name DNAX. DNAX is an acronym formed by the letters designating four separate input parameters of the DNAX function which govern the shape of the output waveform. By astute manipulation of these input parameters and selectively rearranging the form of the DNAX function, nearly any desired output waveform can be mathematically generated via a single mathematical expression.

The DNAX function is a continuous linear function that provides a defined output value for every input value of a continuous input domain. Using the DNAX function, complex waveforms including waveforms having sharp discontinuities which have heretofore defied easy mathematical expression, such as step functions, impulse functions, gate pulses, and binary pulse sequences, may be expressed using a single equation. Furthermore, the mathematical difficulties of dealing with undefined singularities such as the step function or impulse function are substantially eliminated.

Figure 1:
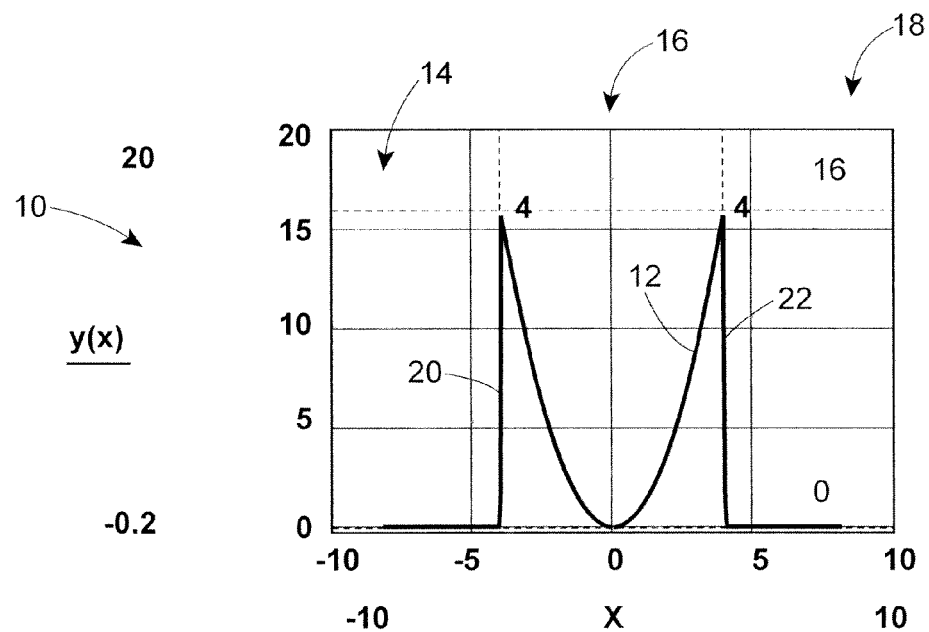
FIG. 1 is a plot showing an example of a complex output waveform having the values $$y(x) = \begin{cases} 0 & \text{for } |x| > 4 \\ x^2 & \text{for } |x| \leq 4 \end{cases}$$

The DNAX function is based on the concept of an operational window. FIG. 1 shows a cartesian coordinate system 10 on which DNAX output waveform 12 is plotted. The output waveform 12 includes three distinct regions. The first region 14 extends from $-\infty$ to $-4$. The second region 16 extends from $-4$ to $+4$. And the third region 18 extends from $+4$ to $+\infty$. Within the first and third regions 14, 18 the value of the output waveform 12 is substantially equal to 0. In the second region 16, however, the value of the output waveform 12 is equal the square of the input value, or $y(x)=x^2$. As will be described below, the output waveform 12 may be expressed with a single DNAX function. The operational window is the second region 16 where the output waveform takes on a non-zero value. The DNAX function allows the creation of output waveforms having any number of operational windows. What is more, the DNAX function allows for precise control over the position and width of such operational windows and the shape of the output waveform within operational windows.

Using conventional mathematical techniques at least two equations are required to describe the waveform 12 shown in FIG. 1:

$$y(x) = \begin{cases} 0 & \text{for } |x| > 4 \\ x^2 & \text{for } |x| \leq 4 \end{cases}$$

Using this mathematical description, the transitions at $\pm 4$, between 0 (the value of the output waveform in the first and third regions 14, 18) and 16 (the value of the function $y=x^2$ at the end points of the operational window are undefined. The vertical line segments at the boundaries between the first and second and second and third regions represent an output function of infinite slope. It is impossible to define the value of the output function y(x) at these transitions using conventional techniques without adding additional complexity to the equations that define the output waveform 12. Using the DNAX function, however, the output waveform illustrated in FIG. 1 can be described in a manner such that all output points are uniquely defined with but a single mathematical function.

Figure 2:
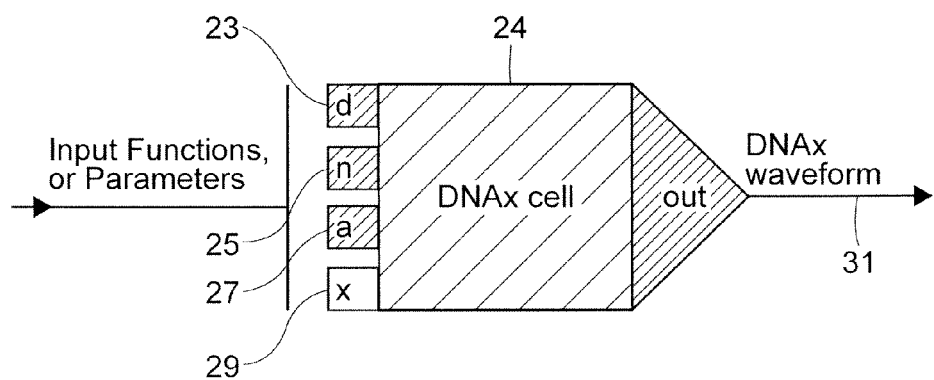
FIG. 2 is a functional block representation of a DNAX function or cell.

FIG. 2 shows the DNAx function in block form. A single implementation of the DNAx function may by implemented as a DNAx cell 24. The DNAx cell 24 may implemented utilizing hardware, a processor executing firmware instructions, a processor executing software instructions, or any combination thereof. When implemented utilizing a processor executing software or firmware instructions, the software or firmware instructions may be stored on any computer readable medium such as on a magnetic disk, an optical disk, or other storage medium, in a RAM or ROM or flash memory, processor, hard disk drive, optical disk drive, tape drive, etc. When implemented in hardware, the hardware may comprise one or more of discrete components, an integrated circuit, a field programmable array (FPGA) an application-specific integrated circuit (ASIC), a microprocessor, etc.

The DNAx cell 24 includes a plurality of inputs 23, 25, 27, and 29 which are provided to receive input signals and/or input values for the various parameters used to define an output waveform 31 using the DNAx technique. Depending on the nature of the desired output waveform, various parameter values may be applied to the inputs 23, 25, 27 and 29 of the DNAx cell 24. The inputs to the DNAx cell 24 include a phase shift parameter "d" 23 the value of which defines a phase shift applied to the location of the operational window, a slew rate parameter "n" which defines the slope of the transitions in the output of the DNAx function between the portions of the output waveform outside the operational window and the one or more portions within the operational window (or windows as the case may be), an operational window width parameter "a" which defines the width of the operational window (or windows), and a position locus parameter "X" which defines the location of the operational window in the output waveform. According to various embodiments of the invention variable functions may be applied to the d, n, a and x inputs 23, 25, 27, 29 to the DNAx cell 24. Thus, depending on the implementation, the parameters d, n, a, and x may be expressed as d(x), n(x), a(x), or X(x). Additional inputs to the DNAx cell 24 may include an operational window function f(x) and a weighting factor b(x).

The DNAx cell 24 implements the DNAx function which may be expressed in two different forms. These are:

$$y(x)=[(a(x)X(x-d))^{n(x)}+f(x)]^{[b(x)-(a(x)X(x-d))^{n(x)}]} \quad \text{1A}$$

and $$y(x)=f(x)[[(a(x)X(x-d))^{n(x)}x)+1]^{[b(x)-(a(x)X(x-d))^{n(x)}]}] \quad \text{1B}$$

The parameter X(x−d) is the position locus parameter, which defines the location of the one or more operational windows along the abscissa axis. The DNAX function generates an operational window whenever X(x−d)=0. The parameter d establishes a phase shift which, when d is not equal to zero, causes the position of the operational window to shift away from the x intercepts of the position locus function X(x) by an amount equal to the value of d. When d equals 0, there is no phase shift and the DNAX function creates an operational window or windows centered on the abscissa intercepts, or zero crossings of the position locus function X(x). Otherwise, the operational window (or windows as the case may be) are shifted in phase by amount equal to the value of d.

The parameter a(x) defines the width of the operational window. Pulse duration or pulse width is defined according to the DNAX technique by the following equation:

$$Pd(x) = \frac{2}{a(x) \cdot \left|\frac{d}{dx}X(x-d)\right|}$$

Thus, pulse duration is inversely proportional to the value of the operational window aperture parameter a(x) and the absolute value of the derivative of the position locus function X(x−d) at the position where X(x−d) crosses the x axis.

n(x) represents the slew rate parameter. This parameter establishes the slope of the transitions into and out of the operational window. As the value of n(x) increases, the slope of the transitions tends toward infinity, providing faster and faster transitions. Nonetheless, even with extremely large values of n(x), resulting in near instantaneous transitions into and out of the operational window, every point on the output waveform is uniquely defined. Depending on the application, n(x) may be a variable function or a constant. Preferably, in order to achieve well behaved output waveforms, n(x) is limited to even constants in those applications where a modulating function is not applied to the n(x) parameter.

The function $f(x)$ represents the window function which defines the output waveform generated by the DNAX function for input values that are within the operational window. The output value of the DNAX function will be substantially equal to 0 or some other base value for substantially all input values outside the operational window. On, the other hand, the output value of the DNAX function will be substantially equal to the output value of the function $f(x)$ for substantially all input values of x within the range of the operational window. The transitions from the base value (typically 0) to $f(x)$ at the leading and trailing edges of the operational window are governed by the slew rate parameter n(x).

The factor b(x) in the exponent term in the equations 1A and 1B is a weighting factor. This factor adds a predefined amount of distortion to the output waveform $f(x)$ within the operational window. Weighting factors and pre-planned distortion will be described in more detail below. b(x)=1 corresponds to no weighting and no distortion added to the output function $f(x)$. For the remainder of this discussion, unless explicitly stated otherwise, the weighting factor b(x) will be set equal to 1. Thus, there will be no distortion added to the output waveform due to intentional weighting.

Having introduced the DNAX function, we will apply the general form of the DNAX function to generate the output waveform 12 shown in FIG. 1. The DNAX input parameters are set as follows:

$$d = 0$$

$$n(x) = 100$$

$$a(x) = \frac{1}{4}$$

$$X(x) = x$$

$$f(x) = x^2$$

Thus, the general form of the DNAX function becomes $$y(x) = \left[\left(\frac{x}{4}\right)^{100} + x^2\right]^{\left[1-\left(\frac{x}{4}\right)^{100}\right]}$$

The general shape of the output waveform may be verified by plotting a small sample of points as shown in the table below.

| x | $x^2$ | DNAx($x^2$) |
|---|---|---|
| −10.00 | 100.00 | 0.000000000000000 |
| −5.00 | 25.00 | 0.000000000000000 |
| −4.10 | 16.81 | 0.000000000000000 |
| −4.05 | 16.40 | 0.000634211875248 |
| −4.01 | 16.08 | 0.445047557071670 |
| −4.0000000000000000 | 16.0000000000000000 | 1.000000000000000 |
| −3.9998575555555500 | 15.9988604647348000 | 1.0101215209168800 |
| −3.9998575555000000 | 15.9988604642904000 | 1.0101215248765600 |
| −3.8999999999999900 | 15.2099999999999000 | 12.3087511446208000 |
| −3.00 | 9.00 | 8.999999999993980 |
| −2.50 | 6.25 | 6.250000000000000 |
| −2.00 | 4.00 | 4.000000000000000 |
| −1.50 | 2.25 | 2.250000000000000 |
| −1.00 | 1.00 | 1.000000000000000 |
| −0.50 | 0.25 | 0.250000000000000 |
| 0.00 | 0.00 | 0.000000000000000 |
| 0.50 | 0.25 | 0.250000000000000 |
| 1.00 | 1.00 | 1.000000000000000 |
| 1.50 | 2.25 | 2.250000000000000 |
| 2.00 | 4.00 | 4.000000000000000 |
| 2.50 | 6.25 | 6.250000000000000 |
| 3.00 | 9.00 | 8.999999999993980 |
| 3.8999999999999900 | 15.2099999999999000 | 12.308751144620800 |
| 3.9998575555000000 | 15.9988604642904000 | 1.010121524876560 |

-continued

| x | x² | DNAx(x²) |
|---|---|---|
| 3.9998575555555500 | 15.9988604647348000 | 1.010121520916880 |
| 4.000000000000000 | 16.000000000000000 | 1.000000000000000 |
| 4.01 | 16.08 | 0.445047557071670 |
| 4.05 | 16.40 | 0.000634211875248 |
| 4.10 | 16.81 | 0.000000000000000 |
| 5.00 | 25.00 | 0.000000000000000 |
| 10.00 | 100.00 | 0.000000000000000 |

From this small sample it is evident that outside the operational window, i.e. for values of x less than −4.00 and greater than +4.00 the output value of the DNAX function is substantially 0. For values of x between −4.00 and +4.00 the output value of the DNAX function is substantially equal to $x^2$. Furthermore, at the edges of the operational window (±4) the transitions 20, 22 between 0 outside the operational window and with the operational window $x^2$ occur very rapidly. In fact, even when the input value of x is within 0.05 of the transition at either edge of the operational window, the output value of the DNAX function is still substantially equal to zero. At the exact edge of the operational window, DNAX equals 1 and within the operational window the output values of the DNAX function rapidly approach $x^2$. Nonetheless the output of the DNAX function is defined throughout the transitions. It should be noted that even these seemingly insignificant deviations from the desired output values at the transitions can be reduced still further (or made larger if so desired) by simply increasing or decreasing the value of the slew rate parameter n(x).

Figure 3:
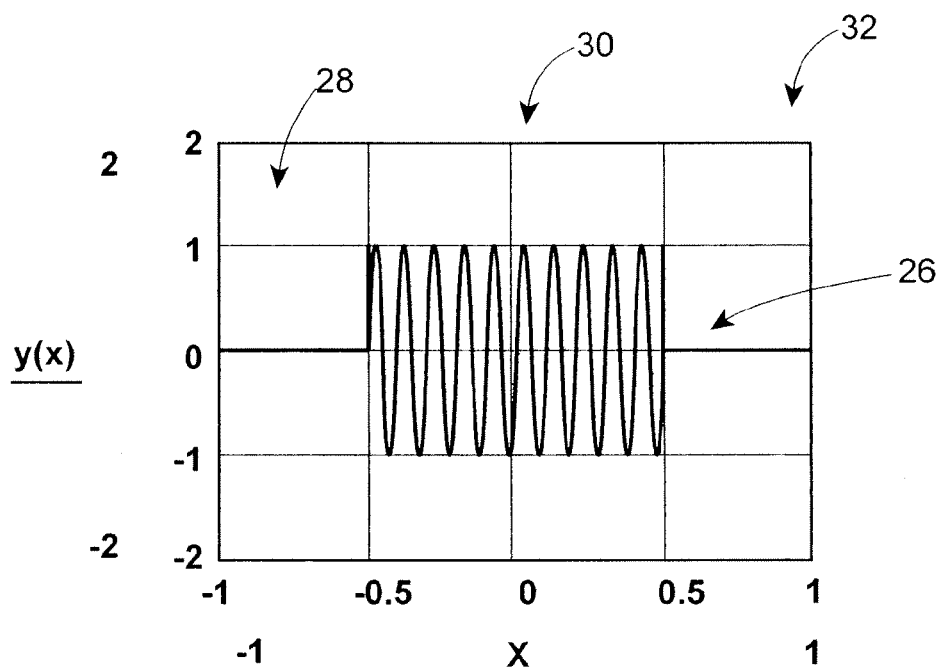
FIG. 3 is a plot showing an output waveform generated using the DNAX function having an operational window 1 unit wide, centered at 0, and having a sinusoidal output within the operational window.
Figure 4:
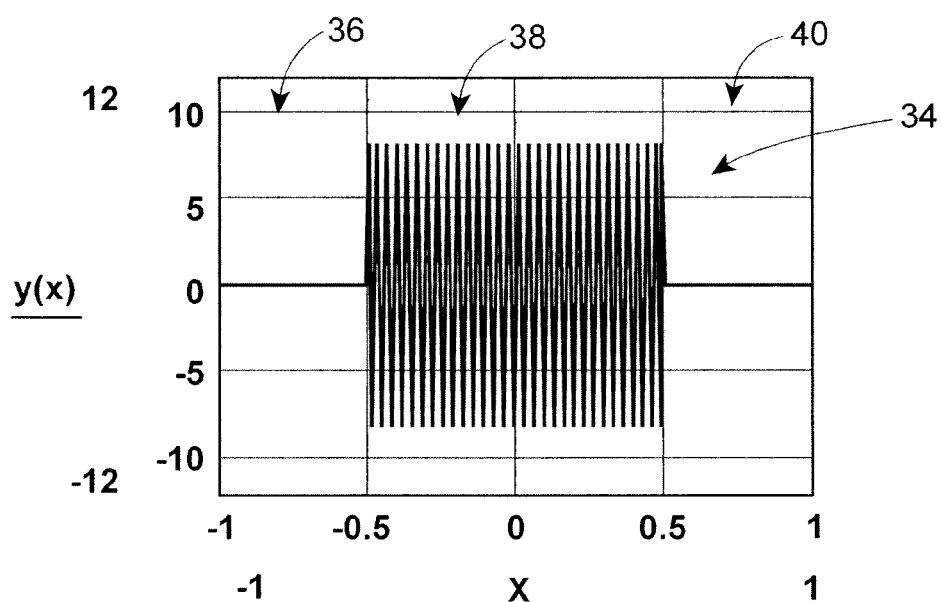
FIG. 4 is a plot showing a waveform generated using the DNAX function similar to the waveform shown in FIG. 3, wherein the frequency of the sinusuidal waveform within the operational window has been tripled, and the amplitude has been multiplied by 8.

FIGS. 3 and 4 illustrate DNAX output waveforms wherein the window function $f(x)$ has been changed to a sine wave. The two waveforms are identical except for the frequency and amplitude of the sine wave that appears within the operational window. The parameters entered into the general form of the DNAX function to achieve the waveforms shown in FIGS. 3 and 4 were as follows:

| FIG. 3 | FIG. 4 |
|---|---|
| d = 0 | d = 0 |
| $n_{(x)} = 10^3$ | $n_{(x)} = 10^3$ |
| a(x) = 2 | a(x) = 2 |
| X(x) = x | f(x) = 8Sin(60πx) |
| f(x) = Sin(20πx) | |

Thus, both waveforms 26, 34 of FIGS. 3 and 4 have a single operational window 30, 38 respectively, centered around the origin extending from −0.5 to +0.5. Furthermore, each waveform 26, 34 includes first regions 28, 36 and second regions 32, 40 defined by input values outside the operational windows where the DNAX functions' output values are substantially zero. Within the operational window 30 of the output waveform 26 of FIG. 3 the output of the DNAX function equals Sin(20πx). Within the operational window 38 of the output waveform 34 of FIG. 4 the output of the DNAX function equals 8 Sin(60πx). Thus, within the operational windows the output waveforms are sine waves having frequencies of 10 Hz and 30 Hz respectively. Thus, the frequency of the waveform displayed within the operational window 38 of waveform 34 is triple that of the waveform displayed in the operational window of waveform 26. What is more, the amplitude of waveform 34 has been increased by a factor of 8. In fact, an important feature of the DNAX function is that there are not limits on the magnitude of the output waveform within the operational window. Any amplitude is possible. It should be noted that the changes brought about between the output waveform of FIG. 3 and that of FIG. 4 were accomplished by simply changing the window function $f(x)$, a single input parameter of the general DNAX function.

Next, we consider the effects of varying the value of the operational window aperture parameter a(x). In employing the DNAX function, we note that pulse duration is defined as $$Pd(x) = \frac{2}{a(x) \cdot \left| \frac{d}{dx} X(x-d) \right|}.$$

Thus, pulse duration is inversely proportional to the value of the parameter a(x) and the absolute value of the derivative of the position locus function. X(x−d). Again, we start with the general form of the DNAX function:

$$y(x) = [a(x) \cdot X(x)^{n(x)} + f(x)]^{[1-(a(x)X(x))^{n(x)}]}$$

we set the DNAX input parameters as follows:
d=0
$n(x)=10^3$
a(x)=1
X(x)=x

Figure 5:
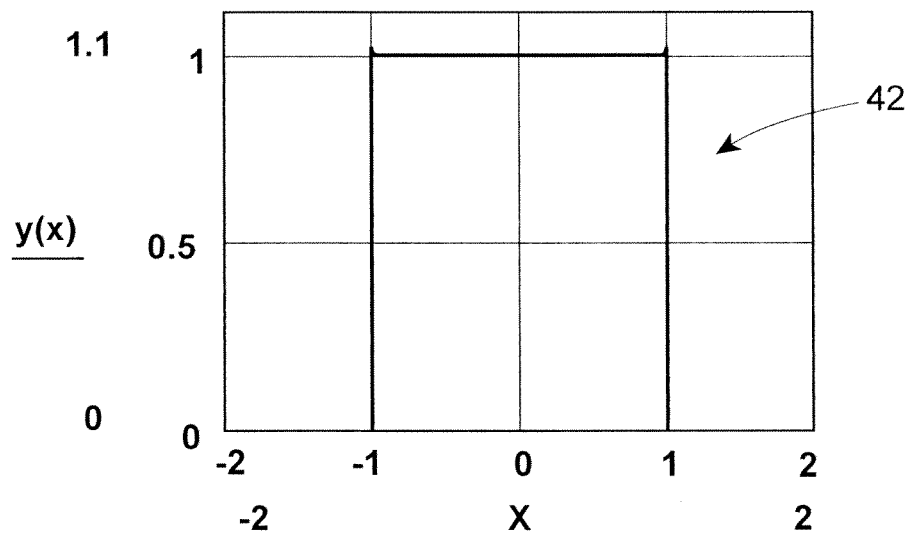
FIG. 5 is a plot showing a rectangular pulse generated using the DNAX function having a pulse width of 2.

Further, we set the window function $f(x)$ equal to a constant, in this case $f(x)=1$, so that the output of the DNAX function will be 1 within the operational window and 0 outside the operational window. With these values the DNAX function reduces to $$y(x) = [(x)^{10^3} + 1]^{[1-(x)^{10^3}]}$$

resulting in the output waveform 42 shown in FIG. 5.

As can be seen, this combination of parameters results in a output waveform which includes a single rectangular pulse of amplitude 1 centered on the origin and extending from −1.0 to +1.0. As with the previous examples, the transitions from 0 to 1 and from 1 to 0 are very steep due to the high slew rate n(x)=1000. Nonetheless, the transitions are continuous and all points on the output waveform are uniquely defined.

The duration of the pulse is 2 due to the relationship between pulse duration and the operational window aperture parameter a(x) and the absolute value of the derivative of the position locus function X(x). Since at x=0, a(x)=1, X(x)=0, and $$\left| \frac{dX(x)}{dx} \right| = 1,$$

the equation for the pulse duration at x=0 becomes $$Pd = \frac{2}{a(x)\left|\frac{dX(x-xd)}{dx}\right|} = \frac{2}{1 \cdot 1} = 2,$$

Thus, the operational window is centered around zero and has end points at −1 and +1 resulting in the pulse duration of 2.

Figure 6:
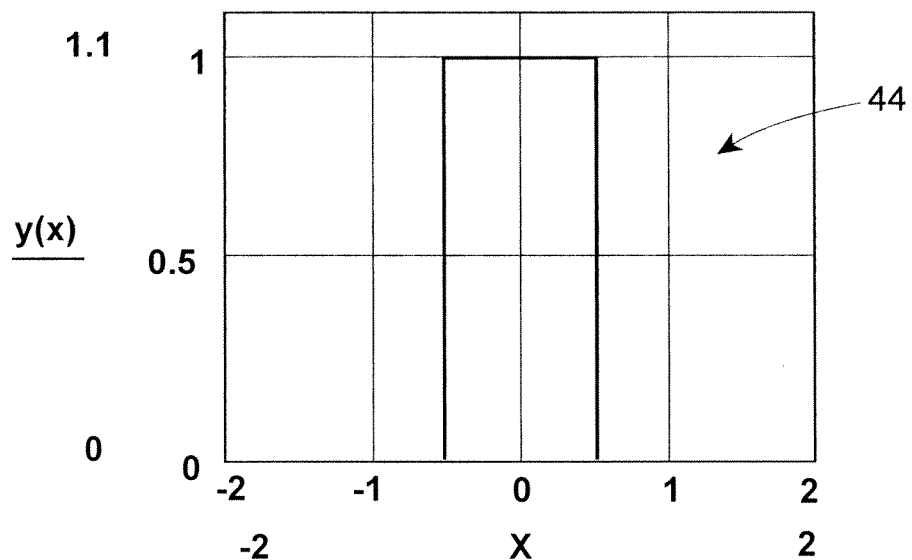
FIG. 6 is a plot showing another rectangular pulse generated using the DNAX function, but with a pulse width of 1.

FIG. 6 shows another DNAX output waveform 44. Again a rectangular pulse of amplitude 1 centered on the origin is generated. The width of the pulse in FIG. 6, however, is half the width of the pulse in FIG. 5. The waveform 44 of FIG. 6 was obtained with the same DNAX function parameters except that the operational window aperture parameter a(x) was changed from a(x)=1 to a(x)=2. Thus, $$Pd = \frac{2}{a(x)\left|\frac{dX(x-xd)}{dx}\right|} = \frac{2}{2 \cdot 1} = 1,$$

and the pulse contained in output waveform 44 begins at −0.5 and ends at +0.5.

Figure 7:
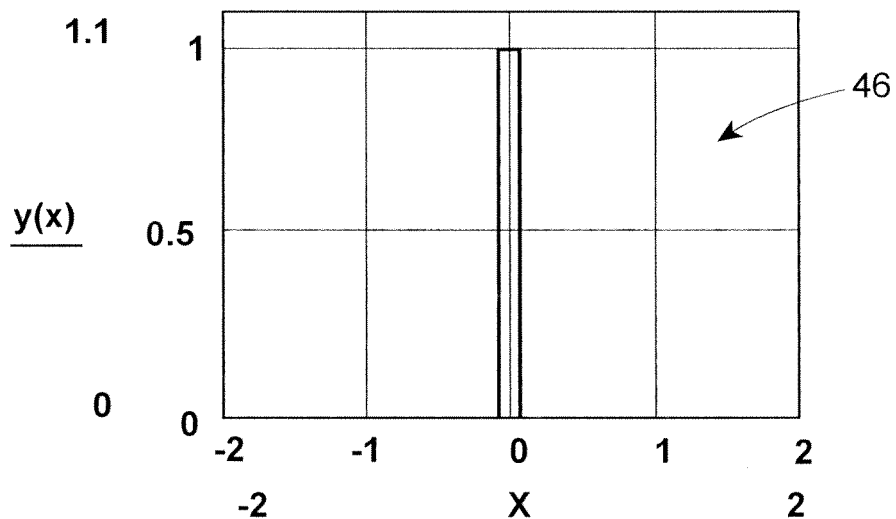
FIG. 7 is a plot showing another rectangular pulse generated using the DNAX function, but with a pulse width of ⅛.

FIG. 7 shows yet another output waveform, 46. In this example, the operational window aperture parameter has been set to a(x)=16. This leads to the narrows duration pulse having transitions at −0.0625 and +0.0625.

Figure 8:
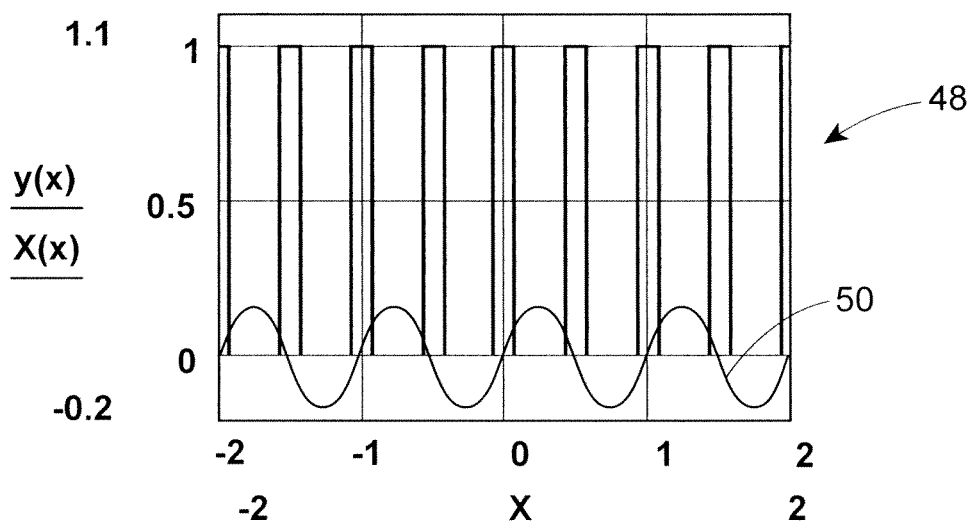
FIG. 8 is a plot showing a rectangular pulse train generated using the DNAX function, the plot also includes the position locus function $$\frac{\pi}{2} \sin 2\pi x$$

Next, we will consider the DNAX function employed to generate a continuous pulse sequence such as the periodic rectangular pulse waveform 48 shown in FIG. 8. In this example, the DNAX parameters have been set as follows:

$$d(x) = 0$$
$$n(x) = 10000$$
$$a(x) = 16$$
$$X(x) = \frac{\sin(2\pi x)}{2\pi}$$

and $$f(x) = 1.$$

Thus, the general form of the DNAX function becomes $$y(x) = \left[\left(\frac{8}{\pi}\sin(2\pi x)\right)^{10000} + 1\right]^{\left[1-\left(\frac{8}{\pi}\sin(2\pi x)\right)^{10000}\right]}$$

Note that the input parameters just described are the same as those for producing the waveform 46 having the narrow ⅛ wide pulse in FIG. 7, except that the value of the position locus parameter X(x) has been replaced with a periodic function. In order to produce the single pulse waveform 46 of FIG. 7, the position locus parameter X(x) was set to X(x)=x (a line having a single x intercept at the origin and a slope equal to one.) whereas to produce the repeating pulses of output waveform 48 of FIG. 8, the position locus parameter is set equal to $$(x) = \frac{\sin(2\pi x)}{2\pi},$$

a periodic function for which the absolute value of its derivative is equal to 1 when the function itself is equal to 0. This position locus function is plotted in FIG. 8. The sinusoidal position locus waveform 50 includes a plurality of regularly spaced zero crossings at 0, 0.5, 1.0, 1.5 . . . etc. (Pi($x_i$:0)).

An important aspect of the DNAX function is that it generates an operational window (and in this case a pulse) corresponding to each position where the position locus parameter X(x) equals zero. If no phase shift is applied (d=0) the operational window (pulse) will be centered around the zero crossings. Therefore, with $$X(x) = \frac{\sin(2\pi x)}{2\pi},$$

pulses are generated at 0, 0.5, 1, 1.5, 2.0, etc., and the output waveform 48 is created. In this case, the pulses are substantially the same as the single pulse shown in FIG. 7, with an amplitude of 1 (f(x)=1) and since $$\left|\frac{d}{dx}\left(\frac{\sin 2\pi x}{2\pi}\right)\right| = 1$$

at Pi(xi:0) and a(x)=16, the pulses have a width of ⅛ with steep relatively fast transitions due to the relatively high value of the slew rate parameter n(x)=10000.

Returning to the single narrow pulse shown in FIG. 7, we will next examine the affect of changing the phase shift parameter d. FIG. 9 shows a gate pulse 47 identical to the gate pulse 46 shown in FIG. 7, but shifted in the positive direction by 0.5. The parameters for generating the gate pulse 47 listed below are identical to those for producing the gate pulse 46 in FIG. 7, but for the value of the phase shift parameter d.
d=0.5
n(x)=10000
a(x)=16
X(x)=x To produce the gate pulse 46 of FIG. 7 centered around the origin, the phase shift parameter was set equal to 0. However, a non-zero value of phase shift parametered d causes the entire pulse to be shifted by an amount equal to the value of the phase shift parameter. In the present example d=0.5 so the position of the pulse is shifted to left 0.5. A phase shift like that just described may be applied to an entire series of pulses (or other window functions) when a non-zero phase shift parameter d is applied to the entire position locus function X(x−d). This situation is shown in FIG. 10 where a sequence of pulses 49 is shown. Each pulse generated corresponding to the zero crossings of the position locus function $$X(x) = \frac{\sin 2\pi x}{2\pi},$$

but the actual position of each pulse is offset from the corresponding zero crossing by 0.5.

To this point, we have explored how the window function f(x) affects the output value of the DNAX output waveform within the operational window. We have shown how the width of the operational window may be varied by manipulating the operational window aperture parameter a(x). We have also examined how the position and number of operational windows can be established by controlling the position locus parameter X(x), and we have discussed how the position of the operational window can be adjusted relative to the zero crossings of the position locus function by varying the phase parameter d.

Now we will consider how the slope of the transitions at the leading and trailing edges of each pulse can be similarly altered by applying different values or variable functions to the slew rate parameter n(x). For illustrative purposes we will examine the effects of varying the slew rate parameter n(x) on a DNAX function configured to produce a single rectangular pulse. The general form of the DNAX function may be re-written as a rational function in the form $$y(x) = \frac{[1 - (a(x) \cdot X(x-d))^{n(x)}]}{[1 + (a(x) \cdot X(x-d))^{n(x)}]}$$

We will use this form of the general DNAX function to illustrate the effects of changing the value of the slew rate parameter n(x). We wish to generate a single square pulse centered on the origin having an amplitude of 2 and pulse width of 1 as well. We select the DNAX parameters as follows:

d=0
n(x)=1000
a(x)=2
X(x)=x
ƒ(x)=1

The result is the square pulse 51 shown in FIG. 11. As can be seen, the pulse has an amplitude of 2 and pulse width of 1 with transitions at ±0.5. Also, clearly visible is the fact that the transitions are extremely steep, very nearly vertical. FIG. 11 also includes three additional DNAX output waveforms 52, 54 and 56 superimposed on one another along with pulse 51. The DNAX input parameters for the additional pulses are identical, except for changes in the value of n(x). The value applied to the slew rate parameter for each waveform is as follows:

Waveform 51: n(x)=1000
Waveform 52: n(x)=100
Waveform 54: n(x)=20
Waveform 56: n(x)=10

For DNAX output waveform 52, the slew rate has been diminished by a factor or 10 relative to the square wave pulse waveform 51. This results in transitions of visibly shallower slope at the leading and trailing edges of the pulse. Reducing the slew rate by an additional factor of 5 results in the considerably rounded pulse of DNAX output waveform 54. And a slew rate of just 10 results in the very gentle rise and fall of the pulse of DNAX output waveform 56.

The last input variable to consider for the general form of the DNAX function is the weight factor b(x). The weight factor b(x) is a factor which determines the linearity of the function ƒ(x) produced within the operational window. Until now, the weight factor b(x) has been set equal to the constant value 1. By changing the weight factor b(x) one may alter the function ƒ(x) within the operational windows in predictable ways. When the weight factor b(x)=1, the function ƒ(x) is reproduced within the operational window unchanged. With other values of b(x), however, the output function ƒ(x) is distorted.

FIGS. 12, 13 and 14 illustrate the consequences of changing the weight factor on a simple function ƒ(x)=x. The output waveform 58 shown in FIG. 12 was generated with DNAX parameters:

d=0.5
n(x)=1000
a(x)=2
X(x)=x
ƒ(x)=x
b(x)=1.

Note that the center of the operational window is shifted to the right by 0.5 due to the phase shift parameter d. The width of the operational window remains 1 due to the operational window aperture parameter value of 2 and the position locus parameter value X(x)=x. In FIG. 12, the weight factor is set to b(x)=1. Since b(x)=1 there is no distortion of the output waveform within the operational window 60. The output waveform 60 within the operational window is the straight ramp function ƒ(x)=x. In FIG. 13 the weight factor has been adjusted to b(x)=0.5, resulting in the output waveform 62. The 0.5 weight factor results in output values greater than ƒ(x) within the operational window 64. Similarly, in FIG. 14 the weight factor has been adjusted to b(x)=2. The result is the output waveform 66. The 2.0 weight factor results in output values less than ƒ(x) within the operational window 68. The distortion added to the window function ƒ(x) is solely a function of the weight factor b(x). By measuring the amount of distortion in a received signal, it is possible to determine the applied weight factor. Furthermore, as with the other DNAX input parameters, the weight factor b(x) may be set equal to a constant or may be set to a variable function. Thus, it is possible to add additional information to a data signal by altering the distortion added by a modulating function applied to the weight factor b(x).

We now turn to a number of applications where the DNAX function may be applied to generate useful waveforms and modulated signals. The present invention involves applying the DNAX function in a number of different ways to generate different waveforms (i.e. signals) on which data may be encoded, or whose shape has some other significance. In some cases the DNAX function may be employed to implement known modulation techniques in an easier more efficient manner. In other cases the DNAX function may be employed to create entirely new modulation and data and coding techniques. Furthermore, the versatility of the DNAX technique allows multiple coding and modulation techniques to be applied to a single waveform, thereby greatly increasing the density of data that can be carried by a single signal.

According to an embodiment of the invention, the DNAX function may be employed to generate a pulse width modulated (PWM) waveform. PWM is a well know modulation technique in which a series of regularly spaced rectangular pulses is modulated by varying the width of each pulse according to the magnitude of a reference or modulating signal.

FIG. 15 shows a pulse width modulated waveform 100 which has been modulated by a sinusoidal modulating waveform 102 shown in FIG. 16. As can be seen, the width of the individual pulses such as pulses 104, 106, 108 and 110 of the waveform 100 vary according to the corresponding magnitude of the sinusoidal modulating signal 102. Pulses corresponding to the peak of the sinusoidal modulating signal (such as pulse 104) have a relatively short duration, while those pulses corresponding to the minimum values of the signal 102 (such as pulse 110) are considerably wider. The width of the pulses corresponding to intermediate values of the modulating signal 102 such as pulses 106, 108 have an intermediate duration directly related to the corresponding magnitude of the modulating signal. In this example, pulse width has an inverse relationship with the magnitude of the modulating signal 102. The pulse width decreases with the increasing magnitude of the modulation and increases with decreasing magnitude. Of course, waveform 100 could have been modulated in exactly the opposite manner, with wider pulses corresponding to higher values of the modulating signal, and narrower pulses corresponding to lower values.

In any case, the PWM waveform 100 was generated according to the present invention using the DNAX function described above. In generating a PWM waveform using the DNAX function, it is first necessary to determine the characteristics of the modulating signal and the desired characteristics of the PWM output waveform. For the example shown in FIG. 15, the modulating waveform, or signal, is a sinusoid having a frequency of 10 khz. The modulating signal is offset, having a peak value of 4, a minimum of 0 and an average value of 2. Thus, the modulating signal s(t) may be represented by the equation $$s(t) = 2\sin(2\pi \cdot 10 \cdot 10^3 \cdot t) + 2$$

Since the frequency of the modulating signal is expressed in khz or thousands of cycles per second, we have replaced the independent variable x with t indicating that the abscissa axis in the accompanying plots relate to time.

Next, we define the characteristics of the PWM output signal and the relationship between the individual pulses of the PWM output waveform and the modulating signal s(t). According to the example shown, the PWM output waveform is formed of a plurality of rectangular pulses each having a peak amplitude of 1 and a minimum value of 0. The rectangular pulses occur periodically at a frequency of 80 khz. We start by generating a sequence of unmodulated pulses having the desired characteristics, i.e., rectangular pulses having an amplitude of 1 and occurring periodically at a frequency of 80 khz as shown at 116 in FIG. 17. The output waveform 116 can be generated using the general form of the DNAX function $$y(t) = [a(t)X(x-d)^{n(t)} + f(t)]^{[b(t)-(a(t)X(x-d))^{n(t)}]}$$

Since we desire pulses having an amplitude of 1 with not distortion, we set $f(t)=1$ and $b(t)=1$. Further, since we desire steep transitions at the leading and trailing edges of each pulse, we set n(t) equal to some arbitrarily large constant such as 1000. The pulses are to be periodic so we must set the position locus parameter X(x−d) equal to a periodic function having zero crossings which occur at the desired pulse frequency. Using the DNAX function to generate pulses, the pulses occur at each zero crossing of the position locus parameter. A sinusoid has two zero crossings per period. Therefore, we may select a sinewave having a frequency equal to one half the frequency of the desired pulse frequency as the position locus function. For convenience, we select $$X(t-d) = \frac{1}{3}\sin\omega t$$

where $\omega = 2\pi f$ and $f=40$ khz. Also since there is no need to shift the location of the pulses relative to the zero crossing of the position locus parameter we may set the phase shift parameter d=0. The position locus function $$\frac{1}{3}\sin\omega t$$

is shown at 114 in FIG. 17. For clarity, position locus function 114 is scaled by a factor of 10 so as to not visually interfere with pulse sequence 116. With these values the general form of the DNAX function becomes $$y(t) = \left[\left(a(t)\frac{\sin(\omega t)}{3}\right)^{10^3} + 1\right]^{\left[1-a(t)\left[\frac{\sin(\omega t)}{3}\right]^{10^3}\right]}$$

To generate the pulse sequence 116 shown in FIG. 17 where each pulse is the same width, a(t) is set equal to a constant rather than a time variable modulating function. However, to convert the unmodulated waveform 116 of FIG. 17 into the PWM modulated waveform 100 of FIG. 15 it is necessary to modulate the operational window aperture parameter a(t) according to the modulation signal s(t) 102.

Central to the concept of pulse width modulation is determining the width of each pulse based on a corresponding value of the modulating signal s(t). Related to the pulse width is concept of duty cycle. The duty cycle of a pulse may be expressed as the percentage of time that the pulse is "on" (equal to 1) during the course of an entire pulse period. Thus, a pulse having a 50% duty cycle will be on for one half of a pulse period and off for the other half. Clearly, altering the duty cycle will have a corresponding effect on the pulse width.

In the present example, we wish to modulate the duty cycle w(t) of each pulse according to the modulating signal s(t) as follows. When the modulating signal is at its peak value, s(t)=4, we want the output pulses to have a 5% duty cycle. When the modulating signal is at its minimum value, s(t)=0, we want the pulses to have an 85% duty cycle. Furthermore, we want the duty cycle to vary linearly between 5% and 85% for intermediate values of the modulating signal, i.e., 0≤s(t)<4. This relationship may be expressed in the linear transfer function $$w(t) = -0.2s(t) + 0.85$$

which is shown graphically at 112 in FIG. 18.

The duration of each pulse is related to the duty cycle w(t) in that the pulse duration is equal to the pulse period multiplied by the value of the desired duty cycle. Using DNAX, the frequency of the position locus parameter determines the frequency of, and therefore the period, of each pulse. In this case the frequency of the position locus parameter is $f = 40 \times 10^3$ hz. Since the period the period T of the position locus function is equal to the reciprocal of the frequency $$T = \frac{1}{f}$$

and since there are two pulses for each cycle of the position locus function, the pulse period is equal to one half the period of the position locus function $$Tp = \frac{T}{2}.$$

Thus, $$Pd(t) = w(t)\frac{T}{2}.$$

Using the DNAX function to generate a series of pulses, the width of the operational window defines the width of each pulse. By definition, the width of the operational window (or windows as the case may be) created by the DNAX function is determined by the equation $$Pd(t) = \frac{2}{a(t)\left|\frac{dX(t)}{dt}\right|}.$$

Thus, the width of each pulse is inversely proportional to the value of the operational window aperture parameter a(t) and the absolute value of the derivative of the position locus function X(x) at the zero crossings of the position locus function. By altering the value of a(t) in accordance with duty cycle transfer function w(t) we can vary the width of the output pulses based on the modulating signal s(t).

We have already defined the pulse position locus parameter as:

$$X(t) = \frac{1}{3}\sin\omega t$$

and the phase shift parameter as:
d=0.
Thus, $$\left|\frac{dX(t-d)}{dt}\right| = \left|\frac{d\frac{1}{3}\sin\omega t}{dt}\right| = \left|\frac{\omega}{3}\cos\omega t\right|.$$

The relationship between the position locus parameter $$X(t) = \frac{1}{3}\sin\omega t$$

and the absolute value of its derivative with respect to time, $$\left|\frac{dX(t)}{dt}\right|,$$

is shown in FIG. 19 where the output waveform 114 shows $$X(t) = \frac{1}{3}\sin\omega t$$

and the output waveform 115 shows $$\left|\frac{dX(t)}{dt}\right|.$$

As can be seen, at the points where X(t) crosses 0, $(P_i(x_i:0))$ |cos ωt|=1, and $$\left|\frac{d}{dt}X(t)\right| = \frac{\omega}{3}.$$

Thus, the equation for determining the pulse duration Pd becomes:

$$Pd(t) = \frac{2}{a(t)\frac{\omega}{3}} \text{ or } Pd(t) = \frac{6}{a(t)\cdot\omega}.$$

Since we have already determined that the pulse duration Pd(t) is equal to the duty cycle function w(t) multiplied by one half the Period of the position locus function T/2, $$Pd(t) = w(t)\frac{T}{2},$$

and since the duty cycle function w(t) may be determined by the linear transfer function $$w(t) = -0.2s(t) + 0.85,$$

we may write:

$$Pd(t) = (-0.2x(t) + 0.85)\frac{T}{2} = \frac{6}{a(t)\omega}.$$

Solving for a(t) we obtain:

$$a(t) = \frac{6}{(-0.2s(t) + 0.85)\frac{T}{2}\omega} \cdot \frac{1}{2f}2\pi f.$$

Solving $$T = \frac{1}{f},$$

and ω=2πf, the above equation becomes:

$$a(t) = \frac{6}{(-0.2s(t) + 0.85)\pi}.$$

Using standard polynomial expansion techniques the above equation may be expressed as:

$$a(t) = 2.247 + 0.2s(t)^2 + 0.14s(t)^3 + 14\cdot 10^{-10}s(t)^{17}.$$

This function is shown in FIG. 20. as can be seen, the output function has a peak value of 38.197 and a minimum value of 2.247. In some cases, as in the present case, it may be desirable to maintain the value of a(t) above some minimum threshold value to prevent over modulation and over-lapping pulses. For example, to ensure adequate spacing between pulses, a(t) may be limited to values greater than 3, a(t)>3. In the present example this may be accomplished by adding an arbitrary constant to the equation for determining a(t). The constant is of sufficient magnitude to raise the minimum value of a(t), above the minimum threshold a(t)>3. In the present example, we select a constant $$c = \frac{\pi}{4}.$$

Thus, the final equation for determining the modulated value of a(t) becomes:

$$a(t) = 2.247 + 0.2x(t)^2 + 0.14s(t)^3 + 14 \cdot 10^{-10} s(t)^{17} + \frac{\pi}{4}.$$

This function may be referred to as the modulation index function. It is plotted along with the sinusoidal modulation signal s(t) 102 in FIG. 21. Since the pulse duration is inversely related to the value of a(t), the duty cycle of the output pulses is narrower for higher values of a(t). Comparing the modulation index function a(t) 120 to the modulation signal s(t) 102, it can be seen that a(t) reaches its greatest value coincidentally with the peaks of the modulation signal s(t), and its lowest value at the minimum values of the sinusoidal modulation signal s(t). Substituting the above modulation index function a(t) into the DNAX function, $$y(t) = \left[ a(t) \cdot \frac{1}{3} \operatorname{Sin}(2\pi \cdot 40 \cdot 10^3 t)^{100} + 1 \right]^{\left[ 1 - \left[ a(t) \frac{1}{3} \operatorname{Sin}(2\pi \cdot 40 \cdot 10^3 t) \right]^{100} \right]}$$

produces the PWM waveform 100 shown in FIG. 15.

Pulse width modulation is but one of the myriad modulation techniques that may be implemented using the DNAX technique. By astute manipulation of the parameters d, n(x), a(b), X(x), f(x), and b(x), communication, data, power and other signals may be modulated and complex waveforms generated in a very straight forward manner. Additionally, modulation techniques may be combined to greatly increase the amount of data that may be encoded onto a single signal. The output waveforms of DNAX functions may be input to parameters of other DNAX functions, acting as modulating signals for other DNAX functions. Such nesting or serial relationships further enhance the usefulness and complexity of the output waveforms that may be generated using the DNAX function. In addition to known modulation schemes, the power of the DNAX function opens the door to new modulation schemes which heretofore would not have been practicable.

Slew rate modulation, is a new modulation technique made possible by the DNAX function. Recall that according to the DNAX technique, slew rate (represented by the parameter n(x) defines the speed with which transitions occur in the output waveform between those portions of the output waveform lying outside an operational window and those within. Employing the DNAX technique to generate a series of pulses, a modulating signal may be input to the slew rate parameter n(x) so that meaningful data may be encoded on the leading or trailing edges of each pulse.

For purposes of illustration we will describe an example of slew rate modulation (SRM) wherein a 50% duty cycle rectangular wave signal will be modulated onto the leading and trailing edges of the pulses of a second rectangular carrier signal. The carrier signal will have an amplitude of 1, a frequency of 2 khz, and 50% duty cycle. It should be understood, however, that SRM may be applied to carrier signals other than a 2 khz, 50% duty cycle rectangular wave carrier, and that signals other than the 2 khz 50% duty cycle rectangular wave modulating signal may be encoded using this technique.

As with PWM, or any other modulation scheme employing the DNAX function, we begin with the general form of the DNAX function:

$$y(t) = [[\alpha(t) \cdot X(t-d)]^{n(t)} + f(t)]^{[b(t) - \alpha(t) \cdot X(t-d)^{n(t)}]}$$

As has already been described, the parameter n(t) determines the slew rate. Thus, by applying a modulating signal to the input parameter n(t), the slew rate of the output waveform y(t) will vary according to the modulating signal.

In the present example the modulating signal is a rectangular wave signal which itself must be generated using to the DNAX function. Thus, we set the slew rate parameter n(t) of our DNAX output equation equal to a first DNAX function adapted to produce the desired modulating rectangular wave output waveform:

$$n(t) = Q[[a(t)X(t-d)]^{m(t)} + f(t)]^{[1-(a(t)X(t-d))^{m(t)}]} + C$$

The DNAX parameters for the modulating waveform n(x) are set as follows:

$$d = \frac{\pi}{4}$$

$$X(t) = \operatorname{Sin}(2\pi \times 10^3 t)$$

$$m(t) = 100 \quad Q = 500$$

$$a(t) = 1.5 \quad C = 5$$

$$f(t) = 1$$

$$b(t) = 1$$

The result of this DNAX function is the rectangular pulse output signal 128 shown in FIG. 22. The position locus signal 20 Sin $2\pi \times 10^3$t 124 is plotted along with square wave output n(t). As with previous examples, a rectangular pulse 122 is generated for each zero crossing of the position locus function X(t)=Sin $2\pi \times 10^3$t 124. The periodic pulse train has a frequency of 2 khz and a 50% duty cycle. Furthermore, each pulse has a maximum value of 505 and a minimum value of 5 due to the multiplier Q and the offset constant C.

As we have noted, the square wave signal n(t) 128 shown graphically in FIG. 22 represents the modulating signal to be applied to the slew rate parameter of our carrier waveform. The carrier signal has the same frequency as the modulating signal. Thus, the carrier signal is a 2 khz square signal wave signal with an amplitude varying between 0 and 1 and a 50% duty cycle. Again we start with the general form of the DNAX function $$y(t) = [(a_1(t)X(t-d))^{n(t)} + f(t)]^{[1-a_1(t)X(t-d)^{n(t)}]},$$

The DNAX parameters for the SRM modulated carrier signal are set as follows:
d=0
n(t)=Q[|a(t)X(t−d)|$^{m(t)}$+1]$^{[1-|a(t)X(t-d)|^{m(t)}]}$+C
a(t)=2
X(t)=Sin ωt; ω=2πf; f=2×10$^3$
f(t)=1
b(t)=1.
The output waveform 126 generated by the DNAX function with the above set of input parameters is shown in FIG. 23. The modulating signal n(t) 128 (divided by 10 to fit the scale shown) is also plotted for reference, as is the position locus function Sin $2\pi \cdot 10^3 t$ 124. As can best be seen graphically, the leading edge 130 of each pulse of the output waveform 126 falls in an area 134 which coincides with a peak in the modulating signal n(t) 128. In contrast, the trailing edges 132 of each pulse coincide with an area 136 where n(t) is at its minimum value. It is also clear that where the modulating signal n(t) is at its peak the overall output function y(t) 126 has the relatively high slew rate, 505, and where n(t) is at its minimum value, the output function y(t) 126 has the relatively low slew rate of 5. Because the leading edges 130 of the output pulses coincide with areas of high slew rate 134, the leading edge transitions 130 are extremely fast, leading to very steep edges. On the other hand, because the trailing edges of the pulses 132 coincide with areas of low slew rate, the trailing edge transitions 132 occur more slowing, resulting in the gentler slope of the trailing edges 132. This effect is clearly illustrated in FIG. 23. The leading edges of each pulse appear substantially vertical, and the trailing edges appear with a pronounced slope.

By altering the value of the phase shift component d in the modulating signal n(t), the pulses of the modulating signal can be phase shifted horizontally, thereby significantly changing the modulated characteristics of the output waveform y(t). For example, FIG. 24 shows an SRM waveform 138 in which the phase shift component of the modulating signal has been removed. The same DNAX output waveform 138 was generated with the same equations as in the previous example, but with d=0 applied to the phase shift parameter of the modulating signal n(t). As can be seen the rectangular pulses of the modulating signal n(t) 128 have shifted so that they now coincide with the zero crossing of the position locus signal 124. Now both the leading and trailing edges 130, 132 of the output pulses of the output waveform y(t) occur in areas corresponding to the peak value in the modulating signal 134. Thus, both leading and lagging transitions occur at the higher slew rate corresponding to faster transitions.

Similarly, the output waveform 140 shown in FIG. 25 shows the modulating signal n(t) 128 phase shifted $\frac{\pi}{6}$ rather than $\frac{\pi}{4}$ or 0. In this example, the trailing edges 132 of the output pulses fall in the area corresponding to the peak value of slew rate signal 134 and the leading edges are located in the troughs 136. Thus, in this example the leading edge transitions 130 take place at the slower slew rate n(t)=5, and the trailing edges 132 occur at the faster slew rate 505.

Finally, FIG. 26 shows a similar SRM modulated waveform 142, but where the duty cycle of the modulation signal n(t) 128 has been reduced by increasing the value of a(t) in the DNAX function generating the modulation signal. The result is that both the leading and trailing edges 130, 132 of the output pulses of the output waveform y(t) 142 occur at locations coinciding with the minimum value of the slew rate parameter n(t). Thus, both the leading and lagging transitions occur at the slower slew rate.

By varying the slew rate parameter in different ways any number of pulse shapes may be obtained. A sampling of various pulse shapes obtained using the SRM modulating technique just described is shown in FIG. 27.

The SRM modulating technique may be implemented in functional block form as shown in FIG. 28. The functional block diagram 144 of FIG. 25 includes two DNAX function blocks or "cells" 146, 148. Each cell represents an implementation of a DNAX function. The first cell 144 represents the DNAX function for generating the modulating signal n(t). The inputs to the first cell 144 include the phase shift parameter d 150, the slew rate parameter $n_1$(t) 152, the pulse width parameter $a_1$(t) 154 and the pulse position locus function X(t) 160. The window function f(t) (not shown) is set equal to 1.

The output of the first cell is the $n_2$(x) parameter 158 input into the second cell 146. Also, input to the second cell 148 is a phase shift parameter d 160, a second pulse width parameter $a_2$(x) 162 and the pulse position locus function X(t) 152. The output of the second cell 144 represents the desired SRM waveform 164.

In this specification we have discussed in depth two separate modulating techniques employing the DNAX function. From these examples, it should be clear that many additional modulation techniques may be advantageously implemented via the DNAX function. Appropriate manipulation of the DNAX function's input parameters can result in data modulation in any number of different ways. For example, in addition to the PWM and SRM modulation techniques described above, the DNAX function may also be employed to implement pulse position modulation, time division multiplexing (TDM), code division multiple access (CDMA), high density high volume data transmission, polynomial encryption, and other signal formats.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of generating a complex waveform using a processing device having a plurality of inputs, the method comprising:
   providing programming instructions for implementing a function on the processing device having the form $$y(x)=[(a(x)X(x-d))^{n(x)}+f(x)]^{[b(x)-(a(x)X(x-d))^{n(x)}]}$$

wherein:
   f(x) comprises a window function for determining an output value of the waveform within at least one operational window defined by the function;
   X(x−d) comprises a positions locus parameter defining a location of the at least one operational window defined by the function, and d represents a phase shift applied to the location of the at least one operational window defined by the function;
   a(x) comprises an operational window defining a width of the at least one operational window;
   b(x) comprises a weighting factor; and
   n(x) comprises a slew rate parameter for determining a slope of transitions between output values of the waveform outside the operational window and values of the waveform within operational window;
   providing one or more inputs to the processing device for defining one or more input values for one or more of the parameters f(x), X(x−d), a(x), and n(x);
   executing the function on the processing device using the one or more input values for the one or more values of the parameters f(x), X(x-d), a(x) and n(x); and
   generating, with a hardware device, an output waveform corresponding to the output value of the function.

2. A system for generating a complex waveform comprising:
   a processing device;
   a memory storing instructions adapted to be executed on the processing device for implementing a function of the form $$y(x)=[(a(x)X(x-d))^{n(x)}+f(x)]^{[b(x)-(a(x)X(x-d))^{n(x)}]};$$

one or more inputs for providing one or more parameter values to the processing device, the one or more parameter values comprising at least one of a window function f(x) for determining an output value of the function within at least one operational window defined by the function, a position locus parameter X(x−d) for defining a location of the at least one operational window defined by the function, an operational window parameter a(x) for defining a width of the at least one operational window, a weighting factor b(x), and a slew rate parameter n(x) for defining a slope of transitions between output values of the function outside the operational window and values of the function within operational window; and an output for generating an output signal having a magnitude corresponding to an output value of the function.

* * * * *